(12) United States Patent
Boussemart et al.

(10) Patent No.: US 7,486,877 B2
(45) Date of Patent: Feb. 3, 2009

(54) DEVICE FOR THE HEATING OF A LIQUID

(75) Inventors: Christophe Boussemart, Lugrin (FR);
Ruguo Hu, New Milford, CT (US);
Jean-Bernard Pulzer, Saint-Sulpice (CH)

(73) Assignee: Nestec S.A., Vevey (CH)

( * ) Notice: Subject to any disclaimer, the term of this patent is extended or adjusted under 35 U.S.C. 154(b) by 75 days.

(21) Appl. No.: 10/521,029

(22) PCT Filed: Jul. 3, 2003

(86) PCT No.: PCT/EP03/07117

§ 371 (c)(1),
(2), (4) Date: Jan. 11, 2005

(87) PCT Pub. No.: WO2004/006742

PCT Pub. Date: Jan. 22, 2004

(65) Prior Publication Data

US 2006/0027103 A1    Feb. 9, 2006

(30) Foreign Application Priority Data

Jul. 12, 2002    (EP)    ................................. 02015461

(51) Int. Cl.
*F24H 1/10*    (2006.01)
(52) U.S. Cl. ......................................... 392/485; 222/71
(58) Field of Classification Search ........................ None
See application file for complete search history.

(56) References Cited

U.S. PATENT DOCUMENTS

| | | | | |
|---|---|---|---|---|
| 978,808 | A | * 12/1910 | Ayer | ........................... 392/462 |
| 3,247,359 | A | * 4/1966 | Feld et al. | .................... 392/480 |
| 3,953,923 | A | * 5/1976 | Rygmyr | ....................... 29/611 |
| 4,975,559 | A | 12/1990 | Frisch | |
| 5,434,388 | A | * 7/1995 | Kralik et al. | ................. 219/538 |
| 6,459,854 | B1 | * 10/2002 | Yoakim et al. | .............. 392/479 |

FOREIGN PATENT DOCUMENTS

| | | |
|---|---|---|
| EP | 0 294 580 | 12/1990 |
| WO | 01 54551 | 8/2001 |

* cited by examiner

*Primary Examiner*—Thor S Campbell
(74) *Attorney, Agent, or Firm*—Bell, Boyd & Lloyd LLP

(57) ABSTRACT

The present invention concerns a device for the heating of a liquid in a beverage machine comprising at least one set of at least two resistors, wherein said resistors are electrically linked together so as to use one resistor of each set individually or in serial with one or more of the resistors of the same set, at least one individual resistor and at least one set of two resistors, wherein said resistors are electrically linked together so as to use the first resistor of a set individually or in serial with one or more of the following resistors of the same set, said resistors transferring the maximum of energy to the flow of liquid and allowing a finer control of the liquid temperature.

19 Claims, 3 Drawing Sheets

DEVICE FOR THE HEATING OF A LIQUID

BACKGROUND OF THE INVENTION

The present invention concerns a device for the heating of a liquid in a beverage machine.

It is already known to have a liquid heating module for use in a hot beverage machine. The patent application WO 01/54551 in the name of the assignee concerns a liquid heating module for use in a hot beverage machine, which comprises a hollow tube of metallic material, a cylindrical insert, disposed inside the hollow tube, at least one electrical resistor on a first part of the outside of the tube for preheating liquid and at least one other electrical resistor on a second part of the outside of the tube for temperature adjustment of the liquid flowing through the tube. The problem with this solution is that the resistors work in parallel and therefore there is a high demand of energy, because said resistors add their energy requirements, which can reach high level, when a high increase of the liquid temperature is required.

The objective of the present invention is to have also a device for the heating of a liquid in a hot beverage machine, wherein the variation of demand of power is less important, wherein the target temperature of the liquid is reached quickly and wherein there is a fine adjustment of the liquid temperature at the moment of the arrival of said liquid on an extraction head or other.

SUMMARY OF THE INVENTION

The present invention concerns a device for the heating of a liquid in a beverage machine comprising at least one set of at least two resistors, wherein
said resistors are electrically linked together so as to use one resistor of each set individually or in serial with one or more of the resistors of the same set, at least one individual resistor and at least one set of at least two resistors, wherein said resistors are electrically linked together so as to use the first resistor of a set individually or in serial with one or more of the following resistors of the same set, said resistors transferring the maximum of energy to the flow of liquid and allowing a finer control of the liquid temperature.

In a first embodiment of the device, classical resistors known per se are used. In this case, there is no criticality in the resistors used: all possible resistors known by a man skilled in the art can be used. In a second embodiment, the resistors used are deposited on a substrate. The substrate can be of any type of material. Preferably, the substrate has good thermal conductivity and low thermal capacity. This substrate is preferably in a metallic or ceramic material.

According to the second embodiment, the electrical resistors are preferably made in a form selected from the group consisting of wires and thick-film. The thick-film technology is known in the electronic area and is now used for the manufacture of resistors. The technology uses conductive inks (like paste) over a substrate of quartz, metal, alumina or beryllium oxide. As said before, it is preferably a metallic substrate.

The electrical resistors have a power density of up to 15 to 70 Watt/cm2. This power density of the resistors allows a very quick increase of the temperature of the water from the room temperature to around 85-90° C. In order to have a good electrical insulation of the hollow tube, it is preferred to have an enamel painting on the outside of said tube under the resistors. The thickness of this painting is normally comprised between 100 and 300 microns. Finally, the electrical resistors of the hollow tube are covered with an electrically non conductive material, for example a layer of enamel painting or a plastic. This insulation can be either a tube or a layer of a non conductive material.

The liquid which has to be heated in the device of the invention is not critical and can be any type of liquid or fluid. Preferably, the liquid heated is water, for example for preparing tea, coffee or other types of beverages. It is also possible to heat milk, for example for the preparation of cocoa beverages. The heater can also be used for heating pumpable fluid or paste, like soups and sauces. The generation of steam can also be considered, for example for heating directly water in a cup or for foaming milk. The use of the device of the invention can be considered for small machines, like coffee machines or bigger machines, like vending machines.

The important feature of the invention is that the device is used with resistors which are in serial relationship: this is important, because in the case of at least three resistors, the power P used is not always the addition of the power of the single resistors, but, for example, in the case of n resistors in serial $P_{total}=(p_1 \times p_2 \times \ldots p_n)/(p_1+p_2+\ldots P_n)$.

The result is that, it is then possible to have a finer adaptation to the required power and then to reach a finer temperature at the exit of the machine. The explanations will be given hereafter in relation with the figures and the example.

Concerning the device for the heating with the electrical resistors structured with at least one set of at least two resistors, in the case of a coffee machine, one to 5 resistors are present, in the case of a vending machine, it is possible to have 1 to 10 resistors. For the device of the invention, with at least one individual resistor and at least one set of at least two resistors, in the case of a coffee machine, two to five resistors are present, in the case of a vending machine, it is possible to have 1 to 10 electrical resistors The resistors are either disposed on a tube or on a flat base.

In the case of the resistors on a tube, the material for the hollow tube is a metal. Preferably, the tube is made of stainless steel. The size of the tube can vary, depending on the type of use. For example, if it is used for a coffee machine, it can have a diameter of about 6 to 20 mm and a length of about 100 to 200 mm. The thickness of the tube is around 1 to 4 mm. In the case of a use in a vending machine, the tube has a diameter of about 30 to 50 mm and a length of about 200 to 400 mm. The thickness of the tube is the same as before.

The ratio of the length of the hollow tube to the diameter of said tube is comprised between about 5 and about 40.

The heating module according to the invention, with resistors on a tube, comprises further a cylindrical insert, which is disposed inside the hollow tube, along its entire length and substantially along its axis of symmetry. The fact that an insert is present enhances heat transfer from the tube surface to the liquid by increasing the water speed which increases the transfer coefficient. The best speed is when a turbulent flow is reached. This allows a good transfer of energy and a quick heating of the water. The insert is made of plastic, metal or ceramic material, which is food grade. The insert is preferably in a low thermal capacity and conductivity material such as plastic and especially teflon (tetra-fluoro-ethylene), but can also be in another food grade material. The ratio of the diameter of the hollow tube to the diameter of the insert is comprised between 1 and 5. It is possible to have either a fixed insert or an insert, which can be rotated along its axis of symmetry. In the case of a rotating insert, said insert is connected with a rotating wheel of a flowmeter disposed at the lower part of the insert and so it can be powered by the flowing cold water, which flows in a tangent angle on to the flowmeter propeller. The rotatable cylindrical insert comprises a metal wire brush. These metal brush bundles are integrated through the insert in a longitudinal plane (on one side only or two symmetric sides of the insert) or on a spiral way, for example 1 or 2 spirals. They are built only in the insert part inside the hollow tube. The brush should be of proper mechanical tensile and strength so that it can descale the inner tube surface. Both the brush bundle ends should be slightly contacted with the inside surface of the tube at 90°. The whole bundles should be designed to push water upwards when it is powered to rotate by the flowmeter propeller.

The insert can also be a hollow object, which will introduce a reversed flow of part of the hot water to mix with the cold water and so to enhance water mixing when the water is heated.

The insert can also present helicoidal grooves on its outside surface: this is a good solution to oblige the liquid to flow into channels and reach a turbulent flow and therefore favours a quick heating at the required temperature. Finally, it is possible to have a spring disposed around the insert.

In the case of the resistors disposed on a flat base, channels are inside a structure for the flowing of the liquid, said channels being positioned along the resistor tracks. In this case, it is either possible to have the resistors on only one side of the structure, or on both sides of the structure. The channels for the flowing of the liquid have a reduced section area, so that the speed of liquid reaches a turbulent flow.

The liquid heating module of the invention is used as a part of a machine for the heating of a liquid for the preparation of a beverage. The present invention concerns further an apparatus for the heating of a liquid comprising
- a liquid supply,
- a pump for supplying said liquid to
- a device for the heating of a liquid as described before, wherein said liquid flows from the liquid supply through a tube or channels in said apparatus,
- a way for the exit of heated liquid, either on a substance to be extracted or in a mixer to mix said heated liquid with a powder.

According to a first embodiment, the liquid heating module is part of a coffee machine or another similar machine based on the extraction of a substance, like coffee or tea. In this case, it is possible to have either directly the substance to be extracted, like a bed of coffee, and then an espresso machine, or the substance to be extracted in already prepared cartridges or capsules, like those object of the European patents No. 512'468 and 602'203.

According to a second embodiment, the apparatus of the invention is used for vending machines, that is a machine where the consumer has directly the cup of tea, of coffee or of cocoa, wherein the heated liquid is mixed just before being delivered in a cup with the corresponding powder.

The apparatus of the invention integrates also other usual elements present normally in coffee or vending machines, like a valve, a temperature control, a flowmeter.

The present invention concerns finally a process for the device described above, wherein the electricity power in resistors and/or set of resistors is controlled so as to provide to the liquid the required energy in real-time to reach the liquid target temperature according to the energy balance.

According to this process, the flow-rate is comprised between 50 and 300 ml/min for a coffee machine and between 300 and 5000 ml/min for a vending machine.

One of the advantage of the process of the invention is that, the machine is always immediately ready to provide hot water at the required temperature or steam without energy consumption during the stand-by phases. For example, there is no more waiting time, when the consumer pushes the "on" position of the machine and the moment when the machine is ready to prepare a coffee. When the consumer decides to prepare a coffee, the pump moves the water to flow in the tube at the level of the first resistor, the pump stops and the first resistor heats the water at a temperature around 72° C. When the necessary energy to heat the amount of water under the first resistor has been delivered, the pump starts again and the water fills the tube at the level of the second resistor. Then, this second resistor heats the cold water coming from the first resistor at 72° C. to around 80° C. and in the same time, the first resistor heats the new cold water coming at ambient temperature to 72° C. The pump starts again and fills the tube to the level of the third resistor, then the second and third resistors are electrically linked in serial to heat the water to 86° C. and the first resistor heats the new cold water from ambient temperature to 72° C. Then, the pump starts again and the water is heated continuously (without any pump stop) to extract the coffee in the cup. Depending on coffee, the procedure takes around 20 to 30 seconds. For the next coffee, the same procedure is repeated.

Another solution consists to fill at the level of the last resistor with a reduced flow-rate (for example by varying the frequency of the pump) and to start at full flow-rate as soon as the last resistor is reached.

The invention is described in further detail in relation with an example.

EXAMPLE

In this case, there are three resistors, R1=750 W, R2=660 W and R3=1300 W. We are here in the embodiment of R1 alone, R2 can be alone or in serial with R3. This means, that you can have following power output possibilities:

| | |
|---|---|
| R1 | 750 W |
| R2 | 660 W |
| R1 R2 | 1410 W |
| R2 + R3 | 438 W |
| R1, R2 + R3 | 1188 W |

The calculation has been made according to the above mentioned formula. As clearly shown in this table, it is not possible according to the invention to have the addition of the 3 resistors, this means that you have a fine adaptation of the temperature without a big power demand. The tube is a stainless hollow tube having a diameter of 20 mm with a length of 170 mm. The insert is made of Teflon and has a diameter of 16 mm and the same length as the hollow tube. The water flows with a flow rate of 50 to 200 ml/min. The required temperature is reached within 4 sec.

Additional features and advantages of the present invention are described in, and will be apparent from, the following Detailed Description of the Invention and the figures.

BRIEF DESCRIPTION OF THE FIGURES

The invention is described in further detail in relation with the drawings, wherein.

DETAILED DESCRIPTION OF THE INVENTION

Figure 1:
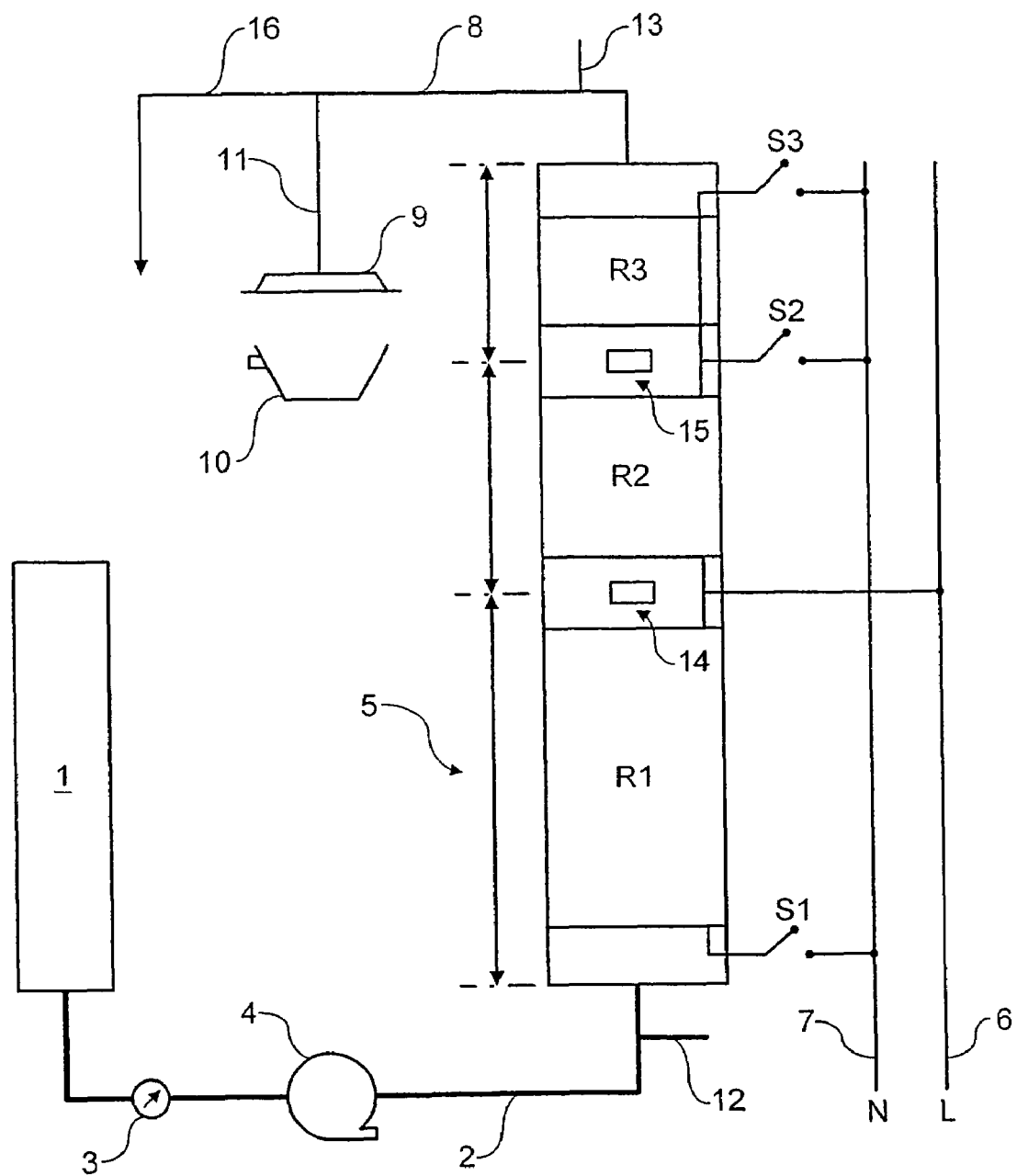
FIG. 1 is a schematic view of the device for the heating of a liquid in a coffee machine for the extraction of closed cartridges according to example 1.

According to FIG. 1, the coffee machine comprises a cold water tank (1) connected through a pipe (2) to a flow-meter (3) and a pump (4) delivering the cold water to the device (5) for the heating of the water. The device (5) is in 3 parts: a first resistor R1 alone and both resistors R2 and R3, which are linked in serial. The connection of these resistors to the power occurs through (6, 7). At the exit of the device (5), the hot water flows through a conduit (8) and arrives through (11) on a cartridge (9) containing roast and ground coffee. This cartridge is a sealed cartridge opening under pressure according to the EP patent No. 512'468. The ready to drink coffee flows in a cup (10). The coffee machine comprises further a cold water temperature sensor (12), a hot water temperature sensor (13) and also sensors (14) and (15) disposed between R1, R2 respectively R2, R3. It is also possible according to the invention to have at the exit of the heating device a conduit (16) for the production of steam. On the electrical circuit, the presence of the switches S1, S2 and S3 are essential for the operation of the coffee machine.

The coffee machine operates as follows: The consumer puts a cartridge (9) and starts the machine. The pump (4) moves the cold water from the tank (1) through the pipe (2) so that the water reaches the level of R1 and the pump stops. At this time, only switch S1 is closed, R1 is under voltage and the water is heated at a temperature around 72° C. When the necessary energy has been transferred from the first resistor to the water (by the energy balance calculation), the pump operates again and moves the water at the level of R2, the pump stops again and switches S1 and S2 are closed. When the necessary energy to heat the water under the second has been transferred by said second resistor to reach around 80° C. and the necessary energy to heat the water under the first resistor has transferred by the first resistor to reach 72° C., the pump operates again and moves the water at the level of the third resistor. Then, switches S1 and S3 are closed and S2 opened, so that the three resistors can transfer energy to the water to heat the water at the exit of the device around 86° C. The pump and heating operate continuously, so that the hot water is brought to the head of extraction.

Figure 2:
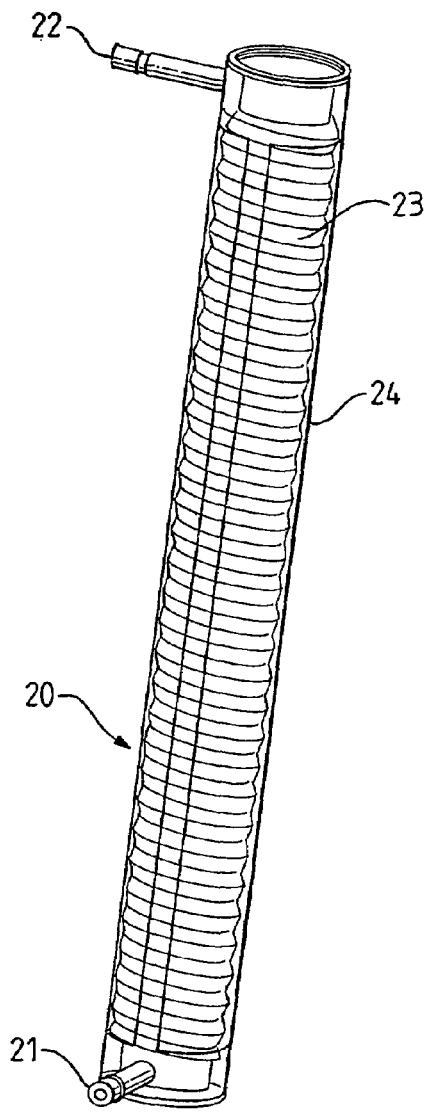
FIG. 2 is a schematic view of the device for the heating in the first embodiment.
Figure 3:
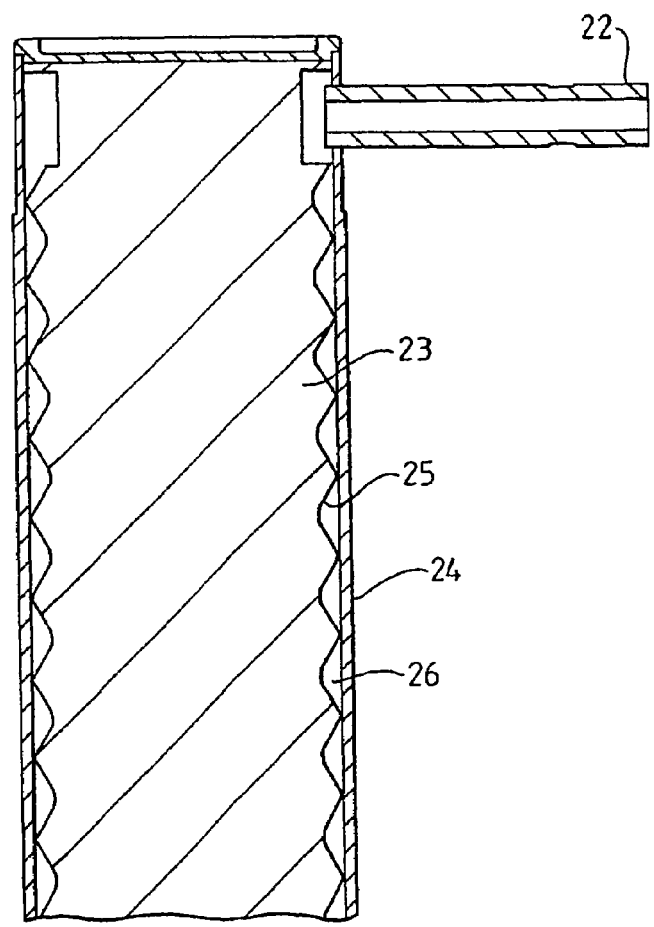
FIG. 3 is an enlarged schematic view of FIG. 2

FIG. 2 and 3 gives a closer view of the heater in the form of a tube. The heater (20) presents a water inlet (21) and a water outlet (22). An insert (23) is inside of the tube and present on its outside helicoidal grooves (25): the water is therefore forced through the way (26). On the outside (24) of the tube, the resistors R1, R2 and R3 (not shown) are present and allows a heating of the water according to the process just described above.

Figure 4:
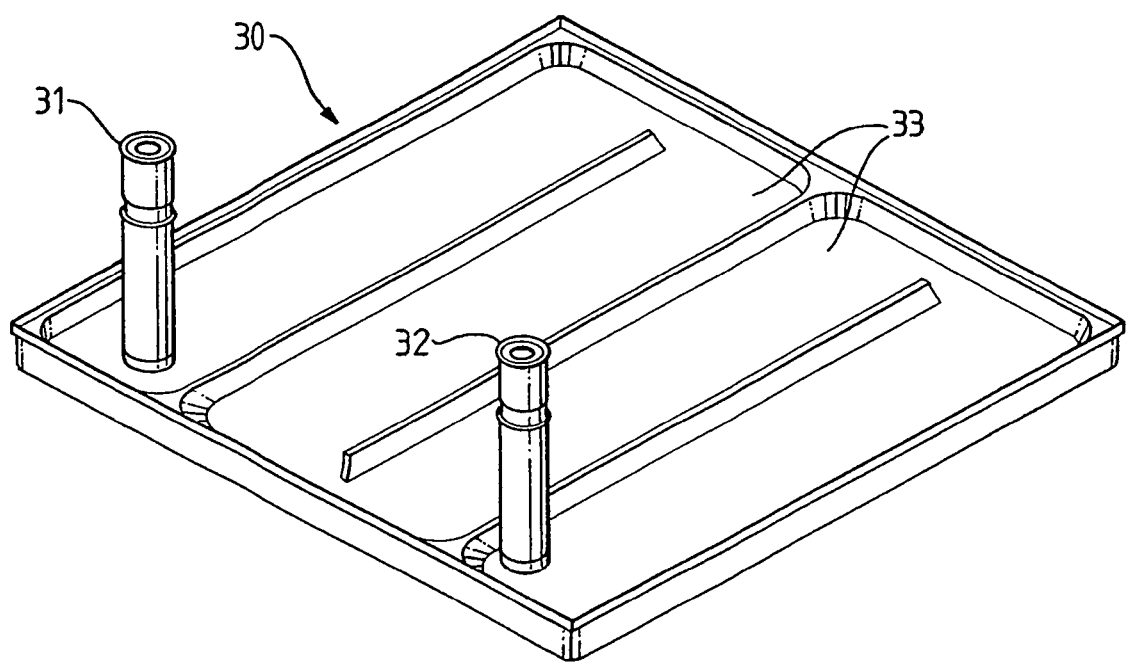
FIG. 4 is a schematic view of the device for the heating in the second embodiment.

FIG. 4 shows the heater (30) in a flat form. There is a water inlet (31) and a water outlet (32). The water flows through the channels (33). According to this embodiment, it is possible to have 1 to 5 resistors (not shown) on one or both faces of the heater.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A device for the heating of a liquid in a beverage machine comprising:
    a tube or flat base arranged so that liquid can traverse the tube or flat base for being heated;
    a first individual resistor placed on a portion of the tube or flat base to heat liquid at a first temperature; and
    a set of at least two resistors is placed on a portion of the tube or flat base to heat the liquid from said first temperature to a final desired temperature, wherein said set of at least two resistors is electrically linked together so that one resistor can be empowered either individually or in serial mounting with one or more of the resistors of the same set, and wherein the first individual resistor can be empowered either individually or in parallel mounting with one resistor of said set of resistors or in parallel mounting with a serial mounting of said set of resistors.

2. A device according to claim 1, wherein the system of resistors is disposed on a tube, the liquid flowing in said tube.

3. A device according to claim 2, wherein the device comprises a cylindrical insert that is disposed inside the tube along the tube's entire length and substantially along the tube's axis of symmetry.

4. A device according to claim 2, wherein the insert comprises helicoidal grooves on the insert's outside surface.

5. A device according to claim 2, wherein a spring is disposed around the insert.

6. A device according to claim 2, wherein the ratio of the length to the diameter of the tube is between about 5 and about 40.

7. A device according to claim 3, wherein the insert is an insulated material selected from the group consisting of plastic, metal, ceramic and combinations thereof.

8. A device according to claim 3, wherein the insert is fixed or can be rotated along the insert's axis of symmetry.

9. A device according to claim 3, wherein the insert is rotated because of the insert's connection with a rotating wheel of a flowmeter disposed at the lower part of said insert.

10. A device according to claim 9, wherein the rotatable cylindrical insert comprises a wire brush.

11. A device according to claim 1, wherein the system of resistors is disposed on a flat base, wherein liquid flows through channels that are positioned along the resistor tracks.

12. A device according to claim 11, wherein the channels for the flowing of the liquid have a reduced section area so that the liquid flow reaches a turbulent flow.

13. A device according to claim 1, wherein the different electrical resistors are in a form selected from the group consisting of wires resistors, thick-film resistors and combinations thereof.

14. A device according to claim 1, wherein all the electrical resistors have a power density of up to 15 to 70 Watt/cm$^2$.

15. A device according to claim 2, wherein the hollow tube (24) comprises enamel painting on the hollow tube's outside under the resistors.

16. A device according to claim 1, wherein the electrical resistors are covered or insulated with an electrically non-conductive material.

17. An apparatus for the heating of a liquid comprising:
    a liquid supply;
    a device according to claim 1 for heating the liquid;
    a pump for supplying said liquid to the device, wherein said liquid flows from the water supply through a tube or channels in said apparatus; and
    a way for the exit of heated liquid, either on a substance to be extracted or in a mixer to mix said heated liquid with a powder.

18. A process for heating the system according to claim 17, wherein the electricity power in resistors and/or set of resistors is controlled so as to provide to the liquid the required energy in real-time to reach the liquid target temperature according to the energy balance.

19. A process according to claim 18, wherein the flow-rate is between 50 and 300 ml/min for a coffee machine and between 300 and 5000 ml/min for a vending machine.

* * * * *